United States Patent
Oya et al.

(10) Patent No.: US 9,766,155 B2
(45) Date of Patent: Sep. 19, 2017

(54) MEASUREMENT OF THE POSITIONS OF CENTRES OF CURVATURE OF OPTICAL SURFACES OF A SINGLE- OR MULTI-LENS OPTICAL SYSTEM

(71) Applicant: TRIOPTICS GmbH, Wedel (DE)

(72) Inventors: Naoji Oya, Shizuoka (JP); Aiko Ruprecht, Hamburg (DE); Eugen Dumitrescu, Wedel (DE)

(73) Assignee: TRIOPTICS GMBH, Wedel (DE)

( * ) Notice: Subject to any disclaimer, the term of this patent is extended or adjusted under 35 U.S.C. 154(b) by 0 days.

(21) Appl. No.: 14/978,208

(22) Filed: Dec. 22, 2015

(65) Prior Publication Data

US 2016/0187222 A1    Jun. 30, 2016

(30) Foreign Application Priority Data

Dec. 24, 2014 (EP) .................................. 14004425

(51) Int. Cl.
| | |
|---|---|
| G01B 9/00 | (2006.01) |
| G01M 11/08 | (2006.01) |
| G01M 11/02 | (2006.01) |

(52) U.S. Cl.
CPC ............. G01M 11/08 (2013.01); G01B 9/00 (2013.01); G01M 11/0221 (2013.01)

(58) Field of Classification Search
CPC ... G01B 11/255; G01B 11/25; G01B 11/2441; G01B 9/02039; G01B 9/02057;
(Continued)

(56) References Cited

U.S. PATENT DOCUMENTS 5,059,022 A * 10/1991 Ookawa .............. G01B 11/255
                                                            356/124
5,844,670 A * 12/1998 Morita ................. G01B 11/255
                                                            356/124

(Continued)

FOREIGN PATENT DOCUMENTS

| DE | 10200402973 A1 | 1/2006 |
| DE | 102013001458 A1 | 7/2014 |
| WO | 2006125609 A1 | 11/2006 |

OTHER PUBLICATIONS

Parks, Robert E., Lens Centering Using the Point Source Microscope, Optical Perspectives Group, LLC, 2007.

*Primary Examiner* — Michael P Stafira
(74) *Attorney, Agent, or Firm* — Lucas & Mercanti, LLP

(57) ABSTRACT

A method for measuring the positions of centers of curvature of optical surfaces of a single- or multi-lens optical system, an imaging lens system simultaneously images an object plane into a first and a second image plane. The optical system is arranged so that a supposed position of a first center of curvature is situated in the first image plane of the imaging lens system and a supposed position of a second center of curvature is situated in the second image plane of the imaging lens system. An object arranged in the object plane is then imaged simultaneously or sequentially at the first and the second image plane by means of measuring light. Reflections of the measuring light at optical surfaces of the optical system are detected by means of a spatially resolving light sensor. The actual positions of the first and the second center of curvature are calculated from the detected reflexes.

17 Claims, 9 Drawing Sheets

(58) Field of Classification Search
CPC .............. G01B 9/0209; G01B 11/0625; G01B 2290/15; G01B 5/213; G01B 9/02007; G01B 9/02065; G01B 9/02071; G01B 11/303; G01B 3/008
See application file for complete search history.

(56) References Cited

U.S. PATENT DOCUMENTS

| | | |
|---|---|---|
| 7,643,149 B2 | 1/2010 | Freimann et al. |
| 7,792,366 B1 * | 9/2010 | Ge .................. G01B 11/272 356/124 |
| 2005/0128468 A1 | 6/2005 | Murata |
| 2008/0316470 A1 * | 12/2008 | Lei .................. G01M 11/0221 356/127 |
| 2012/0133924 A1 * | 5/2012 | Heinisch ............ G01M 11/0221 356/73 |
| 2013/0027692 A1 * | 1/2013 | Ogura ............... G01M 11/0221 356/127 |
| 2015/0323417 A1 * | 11/2015 | Franz ................ G01B 11/26 356/127 |

* cited by examiner

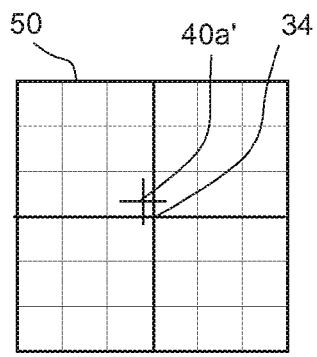 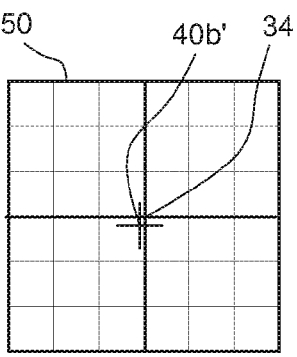 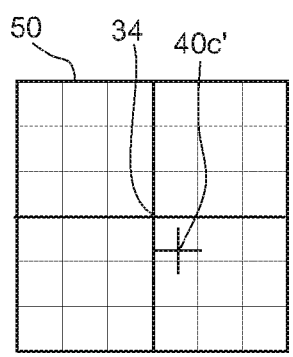
Fig. 8a  Fig. 8b  Fig. 8c
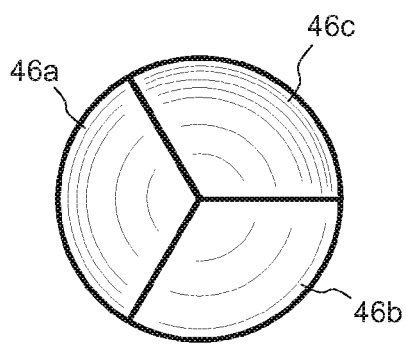 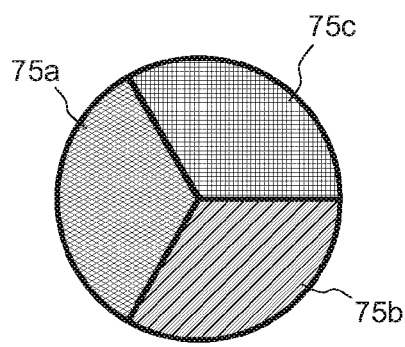
Fig. 10  Fig. 11
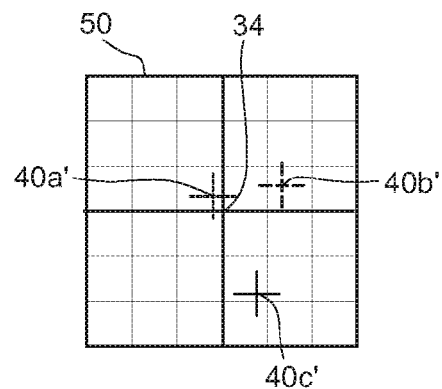
Fig. 12

MEASUREMENT OF THE POSITIONS OF CENTRES OF CURVATURE OF OPTICAL SURFACES OF A SINGLE- OR MULTI-LENS OPTICAL SYSTEM

CROSS-REFERENCE TO RELATED APPLICATIONS

This application claims benefit of earlier European Patent Application No. 14004425.6 filed Dec. 24, 2014. The contents of this earlier application is incorporated by reference herein in its entirety.

BACKGROUND OF THE INVENTION

1. Field of the Invention

The invention relates to a method and a device for measuring the positions of centres of curvature of optical surfaces of a single- or multi-lens optical system.

2. Description of the Prior Art

In the manufacture of high-quality multi-lens optical systems, the lenses must be aligned relative to one another with high accuracy. In order to be able to carry out such alignment, it is necessary to determine the positions of the optical surfaces by measurement. Even if the position accuracy is not checked during alignment of the lenses, such measurements are routinely carried out at least within the scope of quality control.

An important geometrical parameter in the measurement of multi-lens optical systems is the positions of the centres of curvature of the optical surfaces. Ideally, the centres of curvature lie exactly on a common reference axis, which should generally coincide with the axes of symmetry of the lens mounts holding the lenses. In real optical systems, however, the centres of curvature are distributed randomly about that reference axis as a result of manufacturing and mounting tolerances. If the distances of the centres of curvature from the reference axis are too great, the imaging properties of the optical system deteriorate intolerably.

From DE 10 2004 029 735 A1 there is known a method for measuring centres of curvature of optical surfaces of a multi-lens optical system, wherein the positions of the centres of curvature of the individual optical surfaces are measured in succession by means of an autocollimator. For each optical surface, the measurement is preferably carried out several times at different azimuthal angular positions of the optical system. The first surface for which the position of the centre of curvature is measured is the surface that is closest to the autocollimator. As soon as the position of the centre of curvature of this first surface has been determined, the subsequent second surface is measured. However, the first surface influences the measurement of the second surface. The optical effect of the first surface must therefore be taken into consideration mathematically when determining the position of the centre of curvature of the second surface. When taking into consideration the optical effect of the first surface, recourse is made to the design data of the first surface, in particular to the desired radius of curvature and the desired distance from the second surface (that is to say the centre thickness of the first lens). The previously measured position of the centre of curvature of the first surface is additionally taken into consideration mathematically.

The same procedure is followed for all further surfaces. Accordingly, the measured positions of the centres of curvature of all preceding optical surfaces and, in addition, the design data are taken into consideration in the mathematical evaluation.

In this known method, the centre of curvature of an optical surface to be measured must always be situated in the image plane of the autocollimator, whereby the refractive effect of any optical surfaces of the optical system situated upstream in the beam path is to be taken into consideration. It is thus ensured that the measuring light strikes the optical surface to be measured perpendicularly and is reflected back on itself. Only then is the measuring object of the autocollimator, which can be, for example, a cross-wire, imaged sharply on a spatially resolving light sensor of the autocollimator. After each measurement of the position of a centre of curvature, the focal length of the autocollimator must therefore be readjusted. In general, this is carried out by displacing one or more lenses along the optical axis of the autocollimator.

In particular in the case of industrial measuring tasks, where a very large number of optical systems of the same type are to be measured in a short time, a considerable portion of the total measuring time is taken up by this repeated adjustment of the focal length.

Similar problems also arise when measuring the two centres of curvature of a single lens, for example in order to determine its optical axis therefrom. Here too, the focal length must be altered once for each measuring operation.

SUMMARY OF THE INVENTION

Accordingly, the object of the present invention is to provide a method with which the positions of centres of curvature of optical surfaces of a single- or multi-lens optical system can be measured accurately and very quickly. It is a further object of the invention to provide a device with which such a method can be carried out.

With regard to the method, the object is achieved by a method for measuring the positions of centres of curvature of optical surfaces of a single- or multi-lens optical system, which method comprises the following steps:

a) providing an imaging lens system which images at least one, and preferably exactly one, object plane into a first image plane and a second image plane which is different therefrom;

b) so arranging the optical system that, taking into consideration the refractive effect of any optical surface of the optical system situated upstream in the beam path, a supposed position of a first centre of curvature is situated in the first image plane of the imaging lens system and a supposed position of a second centre of curvature is situated in the second image plane of the imaging lens system;

c) simultaneously or sequentially imaging an object arranged in the object plane at the first and at the second image plane by means of measuring light which strikes the optical system from one side;

d) detecting reflections of the measuring light at optical surfaces of the optical system by means of a spatially resolving light sensor;

e) calculating the actual position of the first and of the second centre of curvature on the basis of the reflections detected in step d).

The invention is based on the observation that the rapid measurement of the positions of centres of curvature of two or more optical surfaces does not require a plurality of imaging lens systems that are wholly independent of one another. If there is used an imaging lens system according to the invention which, by means of portions of the measuring light that are separated spatially, according to wavelength or according to polarisation, produces a plurality of image planes in the same beam path which are generally not optically conjugated, movements of optical elements can be avoided with a low outlay in terms of construction. This is a prerequisite for quick measurement, because movements generally do not permit quick measurement of the centres of curvature.

Before the actual measurement, the position of the image planes must be adjusted to the supposed positions of the centres of curvature. After this adjustment, optical systems of the same type can be measured very quickly in a large number, because no lenses or other optical elements in the imaging lens system have to be moved in the axial direction once the imaging lens system has been adjusted or set up.

The spatially resolving light sensor is preferably situated, provided that there is a reflecting surface in the first or in the second image plane, in a further image plane which is optically conjugate to the first and the second image plane.

It is generally sufficient if only a single light sensor is provided. That light sensor then detects the reflections from a plurality of optical surfaces simultaneously. The reflections can generally be distinguished from one another by simple measures, which will be described in greater detail below. In principle, however, it is also possible to provide a plurality of light sensors in order, for example, separately to detect the portions of the measuring light that are separated spatially, according to wavelength or according to polarisation. Those light sensors are then preferably arranged at optically mutually corresponding positions. In particular, the light sensors can be arranged optically equally far from the imaging lens system. "Optically equally far" is here understood as meaning that the optical path length, which, unlike the geometrical path length, takes into consideration the refractive indices of the media through which the light travels, is equal for all distances between the imaging lens system, on the one hand, and the light sensors, on the other hand.

The same applies correspondingly also to the object. Here too, it is generally sufficient if only a single object plane is provided, in which an object is situated. The division of the measuring light into a plurality of portions that are separated spatially, according to wavelength or according to polarisation then does not take place until later in the beam path. It is, however, also possible to provide a plurality of object planes, which can be associated with said portions of the measuring light. Here too, it is generally expedient for the object planes to be situated at mutually optically corresponding positions. In particular, they can be arranged optically equally far from the imaging lens system.

In general, it is expedient if, when measuring the position of a centre of curvature of a surface lying within the optical system, the measured positions of the centres of curvature of the surfaces lying between that surface and the imaging lens system are taken into consideration mathematically, as is known in the prior art. However, such consideration can sometimes be dispensed with, for example if the refraction at the preceding surfaces is very small due to small curvatures or small refractive index differences, or if the method according to the invention is being used only for the qualitative measurement of the positions of the centres of curvature.

In conventional measuring methods, the optical system to be measured is rotated about a precisely determined axis of rotation. That axis of rotation represents a common reference axis for all the optical surfaces, the position of which reference axis is known exactly. Intrinsic measuring errors, which can be attributable, for example, to imaging errors of the imaging lens system, can thus be eliminated.

It is possible to dispense with rotating the optical system to be measured if a calibration measurement is carried out before the centres of curvature are measured, from which calibration measurement an allocation of locations on the light sensor with centres of curvature is derived. In this manner, imaging errors of the imaging lens system and alignment tolerances of other components of the measuring setup can be taken into consideration. When the positions of the centres of curvature are measured, no components are then moved axially during steps c) and d). The entire measuring operation can as a result be carried out extremely quickly. The method can accordingly also be used in connection with the alignment or quality testing of optical systems which are produced in large numbers in an industrial process.

One possibility for such a calibration measurement consists in measuring an optical reference system in which the positions of the centres of curvature are known. The reference system is preferably an optical system which is substantially identical to optical systems that are later to be measured in a larger number. The positions of the centres of curvature of the reference system are determined highly accurately in another external measuring device. Those positions are then associated with the positions that are determined as centres of curvature by the measuring device according to the invention.

Alternatively or in addition, in the calibration measurement the positions of the centres of curvature of a calibration test piece in which the positions of the centres of curvature are unknown can be measured in a plurality of azimuthal angular positions of the optical test system. Measurement in a plurality of angular positions gives the position of the centre of curvature in the manner known per se in the prior art, which is then associated with the location of the reflection on the light sensor. Here too, it is advantageous if the calibration test piece is an optical system which is substantially identical to optical systems that are later to be measured in a larger number.

A further possibility for the calibration measurement consists in measuring, using an external measuring system, the locations at which images of an object imaged by the imaging lens system form in the first and in the second image plane. Imaging errors of the imaging lens system can thus be detected directly and can be taken into consideration mathematically when measuring the positions of the centres of curvature.

In order to be able to dispense with movements of optical elements of the imaging lens system, the first and the second image plane must lie at the supposed positions of the centres of curvature of the optical surfaces to be measured, whereby the refractive effect of optical surfaces of the optical system situated upstream in the beam path is optionally to be taken into consideration. The supposed positions of the centres of curvature are known from the design data of the optical system to be measured. If a different optical system is to be measured, this generally requires the imaging lens system to be adjusted, since the first and the second image plane are then situated at different axial positions. The imaging lens system should therefore comprise adjustable optical elements, at least in the case of measuring systems with which a plurality of different optical systems can be measured.

One possibility for producing two different image planes of a single object plane consists in producing the first and the second image plane by means of ancillary lens systems with different focal lengths. The light paths of the ancillary lens systems are separated by means of first beam splitters arranged before the ancillary lens systems in the light propagation direction and combined by beam combiners arranged after the ancillary lens systems in the light propagation direction. In order to be able to change the position of the image planes, the ancillary lens systems as a whole or parts thereof can be arranged to be axially displaceable.

Another possibility for producing different image planes consists in producing the first and the second image plane in different azimuthal segments, which do not overlap in the region of a collimated beam path, of a measuring light aperture associated with the measuring light. Such segments can be produced, for example, by a special lens which consists of two halves with different focal lengths which are joined together. Where there are more than two different image planes, the number of different segments increases correspondingly.

It is further possible to produce the first and the second image plane in different radial segments, which do not overlap in the region of a collimated beam path, of a measuring light aperture associated with the measuring light. To that end, the imaging lens system comprises, for example, a lens which has a greater refractive power in a circular central region than in a surrounding annular outer region. A similar effect is achieved if two lenses having different diameters are arranged close together, so that a portion of the measuring light passes through both lenses and another portion passes through only one lens.

In the variants described above, the measuring light is separated spatially into different portions. As a further alternative it is proposed to produce the first and the second image plane for measuring light of different wavelengths, that is to say an image plane is clearly associated with each wavelength range, so that the measuring light is divided into different portions according to wavelength. The dispersion of optical elements is thereby used. Chromatically uncorrected lenses have a longitudinal chromatic aberration, which has the result, for example, that the image planes for red light and blue light are different. If a mixture of red and blue light is used as the measuring light, two different image planes are obtained. This approach additionally ensures that the reflections on the spatially resolving light sensor can be distinguished from one another without difficulty, because the reflections have different colours.

In the case of lenses, however, the longitudinal chromatic aberration is generally so small that only closely spaced positions of centres of curvature can be measured. In the case of diffractive optical elements, the refractive effect generally depends to a much greater extent on the wavelength used. The imaging lens system therefore preferably comprises at least one diffractive optical element or a hybrid lens, which is understood as being a refractive lens with diffractive structures applied thereto.

In the following, measures are described for distinguishing from one another the reflections produced by different surfaces on the light sensor.

If the light paths of the measuring light that are associated with the different image planes are separated from one another at least at one location of the measuring light beam path, it is possible to introduce into those light paths filters which make the reflections distinguishable. Such filters can be colour filters or polarisation filters, for example. Instead of filters, it is also possible to use switchable optical elements by means of which the light path can be interrupted. In this manner it can be ensured that, at a given time, only the measuring light associated with a single image plane strikes the optical system to be measured. That measuring light is then screened off by the switchable optical elements, and the measuring light required to measure the position of the next centre of curvature is allowed to pass, and so on.

The reflections can also be distinguished if the images of an object imaged by the imaging lens system and arranged in the object plane are offset laterally on the light sensor. Such a lateral offset can be produced, for example, by arranging the optical system so that it is tilted by a tilt angle $\alpha$ relative to an optical axis of the imaging lens system. As a result, the centres of curvature are at different distances from the optical axis of the imaging lens system. This has the result that the associated reflections, that is to say the images of an object arranged in the object plane, are also at different distances from the optical axis of the imaging lens system and as a result appear laterally offset on the light sensor.

If the imaging lens system additionally images the at least one object plane into a third image plane which is different from the first and the second image plane, images of the object imaged by the imaging lens system can also be offset laterally relative to one another in two directions on the light sensor.

With regard to the device, the object mentioned at the beginning is achieved by a device for measuring the positions of centres of curvature of optical surfaces of a single- or multi-lens optical system, which device comprises:

a) an imaging lens system which is configured to image at least one, and preferably exactly one, object plane into a first image plane and a second image plane which is different therefrom but is situated in the same beam path;

b) a spatially resolving light sensor which is configured to detect reflections of measuring light at optical surfaces of the optical system;

c) an evaluation device which is configured to calculate the actual position of a first and a second centre of curvature on the basis of the reflections detected by the light sensor, after the optical system has been so arranged that, taking into consideration the refractive effect of any optical surface of the optical system situated upstream in the beam path, a supposed position of the first centre of curvature is situated in the first image plane of the imaging lens system and a supposed position of the second centre of curvature is situated in the second image plane of the imaging lens system, and after an object arranged in the object plane has been imaged simultaneously or sequentially at the first and at the second image plane by means of measuring light which strikes the optical system from one side.

The evaluation device can be configured, when calculating the position of a centre of curvature of an optical surface lying within the optical system, to take into consideration mathematically the measured positions of the centres of curvature of the optical surfaces lying between that optical surface and the imaging lens system.

The imaging lens system can be so designed that it does not comprise optical elements which are movable in the axial direction.

The evaluation device can comprise a data storage means in which there are stored data which relate to the allocation of positions of centres of curvature with locations on the light sensor.

The reflections can be detectable only in a single azimuthal angular position of the optical system relative to the optical axis of the imaging system.

The imaging lens system can comprise two ancillary lens systems with different focal lengths, the light paths of which are separated by first beam splitters arranged before the ancillary light systems in the light propagation direction and combined by beam combiners arranged after the ancillary lens systems in the light propagation direction.

The imaging lens system can comprise at least one optical element which has different properties, in particular a different refractive power, in the azimuthal direction.

Alternatively or in addition, the imaging lens system can comprise at least one optical element which has different properties, in particular a different refractive power, in the radial direction.

In addition, the imaging lens system can comprise a multi-focal diffractive lens or a hybrid lens.

There comes into consideration in particular the use of an imaging lens system which comprises an optical element with longitudinal chromatic aberration, whereby first and second measuring light that differs in terms of wavelength is used for measuring the centres of curvature.

The images of an object imaged by the imaging lens system and arranged in the object plane can be offset laterally on the light sensor. If the imaging lens system additionally images the at least one object plane into a third image plane which is different from the first and the second image plane, the images of the object imaged by the imaging lens system can be offset laterally relative to one another in two directions on the light sensor.

The invention additionally provides a method for measuring the positions of centres of curvature of optical surfaces of a plurality of single- or multi-lens optical systems which are of substantially the same construction, comprising the following steps:

a) imaging at least one object into a first and into a second image plane;

b) so arranging a calibration test piece, which is of at least substantially the same construction as the optical systems, that, taking into consideration the refractive effect of any optical surface of the optical system situated upstream in the beam path, a supposed position of a first centre of curvature of the calibration test piece is situated in the first image plane and a supposed position of a second centre of curvature of the calibration test piece is situated in the second image plane;

c) detecting the locations at which reflections of the measuring light at optical surfaces of the calibration test piece strike at least one spatially resolving light sensor;

d) so arranging one of the optical systems that, taking into consideration the refractive effect of any optical surface of the optical system situated upstream in the beam path, a supposed position of a first centre of curvature of the one optical system is situated in the first image plane of the imaging lens system and a supposed position of a second centre of curvature of the one optical system is situated in the second image plane of the imaging lens system;

e) detecting the locations at which reflections of the measuring light at the optical surfaces of the one optical system strike the at least one spatially resolving light sensor, wherein no further detection of locations at which reflections of the measuring light at the optical surfaces of the one optical system strike the at least one spatially resolving light sensor is carried out in a different angular position of the one optical system, and wherein no optical elements of at least one imaging lens system which images the at least one object at the image planes are moved axially;

f) determining the first and the second centre of curvature of the one optical system on the basis of the locations detected in step e) and taking into consideration the locations detected in step c) for the calibration test piece;

g) repeating steps d) to f) for another of the optical systems.

This aspect of the invention is based on the finding that it is possible to dispense with measuring the optical system in a plurality of azimuthal angular positions, as is conventionally necessary, if, before the centres of curvature are measured, a calibration measurement is carried out using a calibration test piece. The calibration test piece is of at least substantially the same construction as the optical systems for which the positions of the centres of curvature are actually to be measured. "Substantially the same" is here understood as meaning that the optical systems have the same optical design but can differ slightly from one another as a result of material faults, alignment tolerances or other manufacturing errors. This calibration measurement provides an allocation of locations on the light sensor with actual positions of centres of curvature.

As a result, the measuring operation as a whole can be carried out extremely quickly. The method can thereby also be used in connection with the alignment or quality testing of optical systems which are produced in large numbers in an industrial process.

The plurality of image planes can, as described above, be provided by an imaging lens system which images at least one, and preferably exactly one, object plane into a first image plane and a second image plane which is different therefrom but is situated in the same beam path. However, it is also possible to use measuring devices known in the prior art, in which the image planes are produced in beam paths that are separate from one another.

One possibility for a calibration measurement consists in measuring the positions of the centres of curvature of the calibration test piece beforehand or subsequently by means of an external measuring device. These actual positions of the centres of curvature are then associated with locations at which reflections are detected on the at least one light sensor.

Instead of using an external measuring device, measurement of the positions of the centres of curvature can also be carried out in the same measuring device as is later used for measuring the plurality of optical systems. To that end, it is merely necessary that the measuring device has a turntable. The calibration test piece can then be measured in a plurality of azimuthal angular positions, as is known in the prior art. The locations at which reflections form on the at least one light sensor then lie on a circular path whose mid-point coincides with the axis of rotation of the turntable. The radius of the circle gives the distance of the centre of curvature from the axis of rotation.

A further possibility for the calibration measurement consists in measuring, by means of an external measuring system, the locations at which images of an object imaged by an imaging lens system form in the first and in the second image plane. Imaging errors of the imaging lens system can thus be detected directly and can be taken into consideration mathematically when measuring the positions of the centres of curvature.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

Further features and advantages of the invention will become apparent from the following description of embodiments with reference to the drawings, in which:

FIGS. 8a to 8c show the images of a crossed-slit diaphragm on a light sensor of the measuring device shown in FIG. 7;

FIG. 10 is a top view of an arrangement of segment-like zoom lenses of the measuring device shown in FIG. 9;

FIG. 11 is a top view of an arrangement of three colour filters of the measuring device shown in FIG. 9;

FIG. 12 shows images in different colours of a crossed-slit diaphragm on the light sensor of the measuring device shown in FIG. 9;

DETAILED DESCRIPTION OF THE INVENTION

1. Introduction

Figure 1:
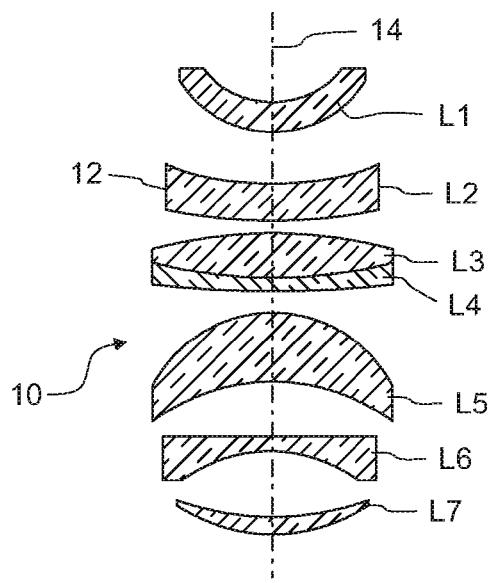
FIG. 1 is a meridional section through a multi-lens optical system in which all the lenses are aligned perfectly with a reference axis.

FIG. 1 shows, in a meridional section, an optical system, designated 10 as a whole, which comprises seven lenses L1 to L7. The two lenses L3 and L4 are joined together without a gap and form a doublet used as an achromatic lens. The lenses L1 to L7 have a cylindrically ground lens edge 12, which in each case is housed in a lens mount (not shown).

In the ideal case, the lenses L1 to L7 are so aligned that their optical axes all lie on a common reference axis 14, which at the same time is the axis of symmetry of the cylindrical lens edges. The reference axis 14 is then generally referred to as the optical axis of the optical system 10.

Figure 2:
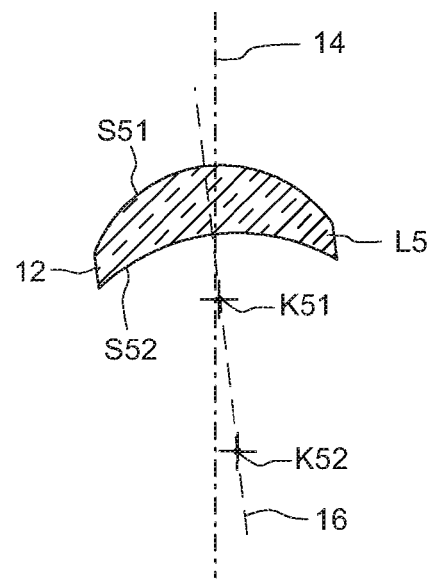
FIG. 2 shows a single lens from the optical system shown in FIG. 1, but which is tilted relative to the reference axis.

In real optical systems, however, deviations from such an ideal alignment occur due to manufacturing and mounting tolerances. FIG. 2 shows, for lens L5 by way of example, how a slight (but in FIG. 2 exaggerated) tilting of the lens L5 in the lens mount affects the centering. It is here assumed that the two lens surfaces S51 and S52 of the lens L5 are spherical and have centres of curvature which are designated K51 and K52 in FIG. 2. The centres of curvature K51 and K52 define the optical axis of the lens L5, which optical axis is shown by a broken line 16 in FIG. 2. As a result of this definition, the optical axis 16 always runs perpendicular to the spherical optical surfaces S51, S52 of the lens L5.

In the case of aspherical lenses, the optical axis is defined by the centres of curvature of the spherical portion of the aspherical lens surfaces.

Tilting of the lens L5 can be caused, for example, by the lens L5 not being inserted correctly into its lens mount. A possible reason for this is, for example, that the lens edge 12 was not ground in such a manner that its axis of symmetry is in line with the optical axis 16 of the lens L5.

In order to align the lens L5 correctly with the reference axis 14 of the optical system 10, the lens L5 would have to be tilted and optionally additionally displaced perpendicularly to the reference axis 14 so that the optical axis 16 is in line with the reference axis 14, as has been assumed in FIG. 1.

Figure 3:
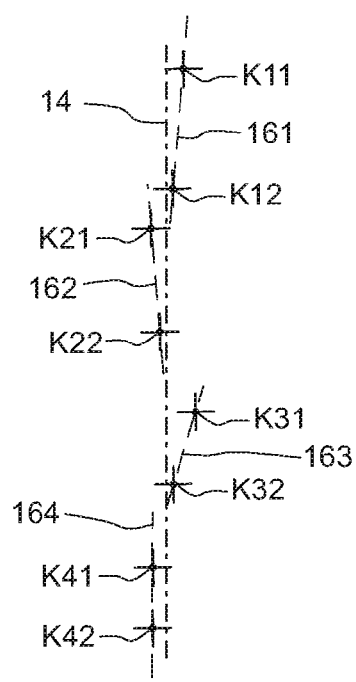
FIG. 3 is a schematic representation of the centres of curvature of a multi-lens optical system.

In the case of a multi-lens optical system, as is shown in FIG. 1, the optical axes of the individual lenses are generally distributed more or less unevenly relative to the reference axis 14, depending on the quality of the centering. This is shown by way of example in FIG. 3 for an optical system having four lenses with centres of curvature K11, K12, K21, K22, K31, K32 and K41, K42; the optical axes of the four lenses are denoted 161, 162, 163, 164. In order to improve the centering of the lenses in such an optical system, several lenses must be tilted and/or displaced in translation in order that all the optical axes 161, 162, 163, 164 are in line with the reference axis 14.

Figure 4:
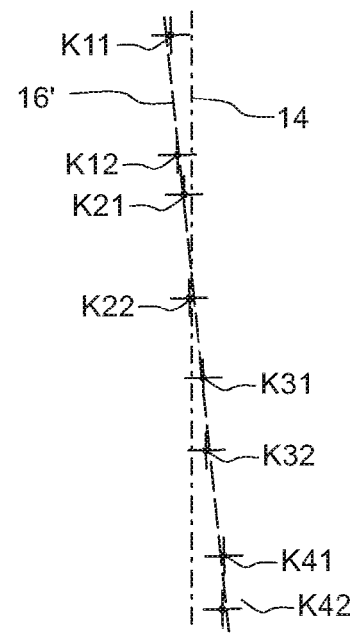
FIG. 4 is a schematic representation as in FIG. 3, but wherein the centres of curvature lie on a straight line different from the reference axis.

Sometimes, as is shown in FIG. 4, it can also happen that, although the optical axes of the lenses are arranged (at least approximately) on a common optical axis 16', that axis is not in line with the reference axis 14. In such a case, it can be more convenient not to realign the individual lenses but to fit the optical system as a whole into a higher-level unit in such a manner that it is aligned in the higher-level unit not with respect to its reference axis 14, which can be defined, for example, by lens mounts or an objective housing, but with respect to its optical axis 16'.

In order, where appropriate, to be able to realign individual lenses of an optical system or the optical system as a whole, but also for routine quality control, a measuring device according to the invention is used, with which the positions of the centres of curvature of the optical surfaces can be measured with high accuracy. From the positions of the centres of curvature, the locations of the optical axes of the individual lenses and the deviation thereof from a reference axis 14 can be determined. It is further possible to determine parameters derived therefrom, for example the radii of curvature of the optical surfaces. In the following section 2, the structure of a conventional autocollimator will first be explained with reference to FIGS. 5 and 6, before a measuring device according to the invention and the measuring method which can be carried out therewith are discussed in section 3.

2. Structure of an Autocollimator

Figures 5, 6:
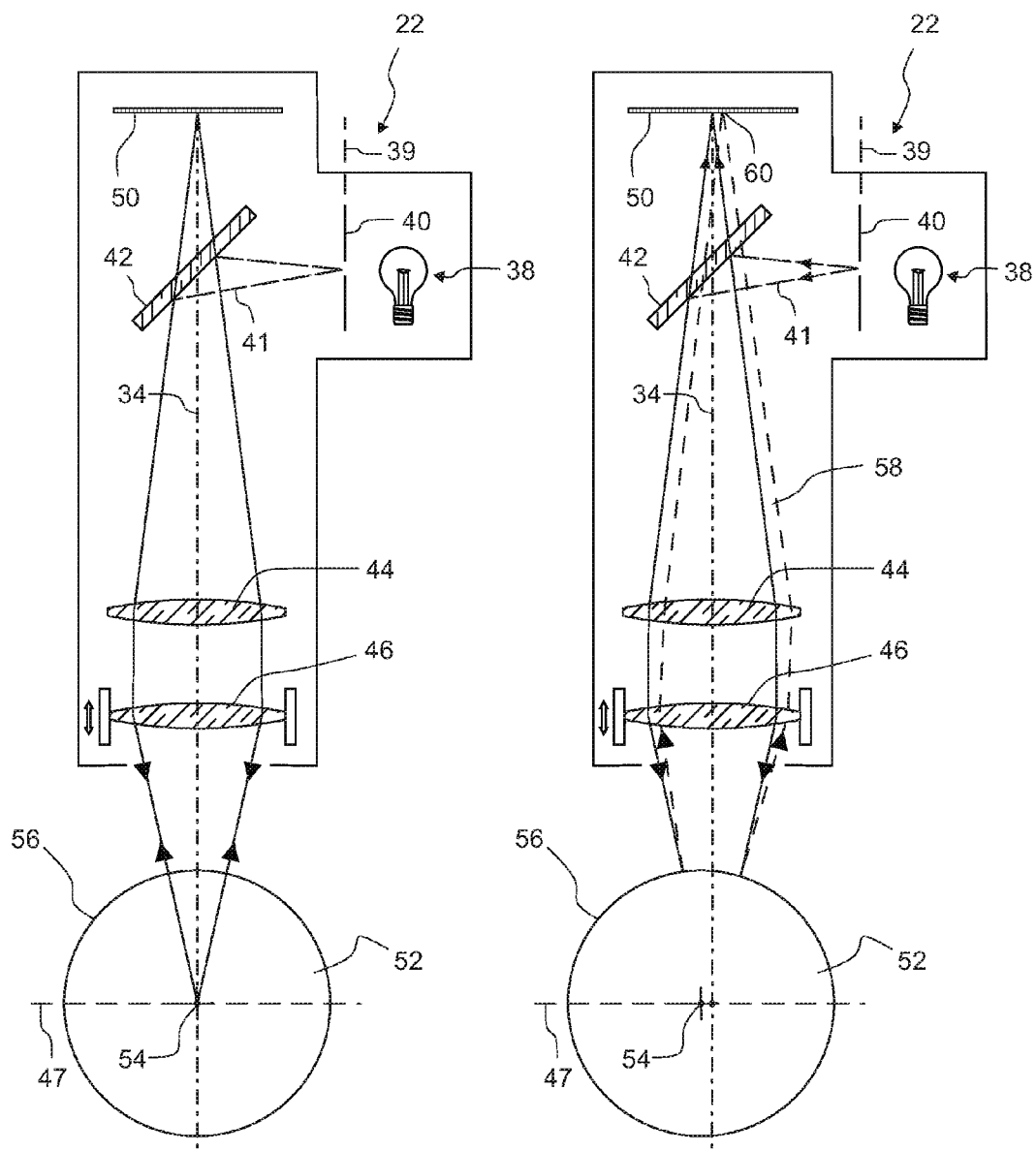
FIG. 5 is a meridional section through an autocollimator according to the prior art in the measurement of a spherical lens aligned exactly with the reference axis.
FIG. 6 shows the autocollimator of FIG. 5 but with a spherical lens that is off-centre.

The autocollimator shown in a meridional section in FIG. 5 and designated 22 as a whole comprises a light source 38 which illuminates a crossed-slit diaphragm 40 arranged in an object plane 39 with measuring light 41. The measuring light 41 leaving the crossed-slit diaphragm 40 is directed via a beam splitter 42 to a collimator lens 44 and leaves the collimator lens as a beam cluster. A zoom lens 46, which is movable along an optical axis 34 of the autocollimator, focuses the collimated measuring light 41 in a focal plane. Because a real image of the crossed-slit diaphragm 40 forms there, that focal plane will be referred to in the following as the image plane 47.

On the rear side of the beam splitter 42 there is arranged an image sensor 50, which is here understood as being a light-sensitive spatially resolving sensor. Suitable as the image sensor are, for example, CCD or CMOS sensors known per se.

The function of the autocollimator 22 will be explained in the following with reference to FIGS. 5 and 6. The measuring light 41 leaving the autocollimator 22 is here directed at a test piece, which for the sake of simplicity is a sphere 52. If the mid-point 54 of the sphere 52, and thus the centre of curvature of its surface 56, lies exactly in the image plane 47 of the autocollimator 22, the measuring light from the autocollimator 22 strikes the surface 56 of the sphere 52 perpendicularly. Consequently, the measuring light 41 is reflected back on itself at the surface 56 of the sphere, passes through the zoom lens 46, the collimator lens 44 and, for a large part, also through the beam splitter 42 and produces an image of the crossed-slit diaphragm 40 on the image sensor 50. If the mid-point 54 of the sphere 52 is situated on the optical axis 34 of the autocollimator, the image of the crossed-slit diaphragm 40 on the image sensor 50 is likewise centred on the optical axis 34.

FIG. 6 shows the beam path in the case where the sphere 52 has been displaced perpendicularly to the optical axis 34 of the autocollimator 22. As a result of this displacement, the light beams no longer strike the surface 56 of the sphere 52 perpendicularly and are therefore also not reflected back on themselves. The reflected measured light 41, shown by the broken line in FIG. 6, therefore produces on the image sensor 50 an image 60 of the crossed-slit diaphragm 40 that is off-centre relative to the optical axis 34.

Because the off-centre of the sphere 52 ultimately means that the portion of its surface 56 facing the autocollimator 22 is tilted, the autocollimator 22 ultimately measures the angle enclosed by the surface 56 of the sphere 52 and the optical axis 34. The autocollimator therefore constitutes an angle-measuring device in the broader sense. Accordingly, other contactless angle-measuring devices can also be used instead of the autocollimator 22 for the measuring device described hereinbelow.

In the case of lenses with spherical surfaces, this measuring operation functions in the same manner, except that the measurement yields not the position of the mid-point of a sphere, as in the case of a sphere, but the position of the centre of curvature of the spherical surface in question. The centre of curvature of the spherical portion of aspherical optical surfaces can also be measured in this manner.

3. Structure of a Measuring Device According to the Invention

In the following, the structure of a measuring device 60 according to the invention will be explained with reference to FIG. 7. The measuring device 60 comprises a computing unit 63 and the autocollimator 22 described hereinbefore with reference to FIGS. 5 and 6, in which the movable zoom lens 46 has, however, been replaced by a lens system 62.

The lens system 62 in this embodiment comprises a first beam splitter 66a, a second beam splitter 66b and a first deflecting mirror 67. The first beam splitter 66a divides the light path into a first partial light path 68a and a further light path, which is divided by the second beam splitter 66b into a second partial light path 68b and a third partial light path 68c. The first deflecting mirror 67 deflects the third partial light path 68c in such a manner that a movement section is formed, in which the three partial light paths 68a, 68b and 68c extend parallel to one another. In this movement section, a first, a second and a third zoom lens 46a, 46b and 46c are movably arranged in the partial light paths 68a, 68b and 68c, as is indicated by arrows in FIG. 7. The zoom lenses 46a, 46b and 46c each assume in the partial light paths 68a, 68b and 68c the function of the zoom lens 46 of the autocollimator 22 shown in FIGS. 5 and 6. In addition, in the region of the movement section, a first shutter 69a, a second shutter 69b and a third shutter 69c are arranged in the partial light paths 68a, 68b and 68c. The shutters 69a, 69b and 69c can be in the form of, for example, slit diaphragms or LCD diaphragms and are to have the property of quickly being able to fully close or fully open the partial light path 68a, 68b or 68c in question.

The lens system 62 further comprises a second beam combiner 70b which combines the second partial light path and the third partial light path 68c deflected by a further deflecting mirror 71 to form one light path, and a first beam combiner 70a which combines that light path with the first partial light path 68a and thereby superposes them to form a common light path. By superposing the partial light paths 68a, 68b and 68c in that manner, the lens system 62 simultaneously produces a first image plane 47a, which is produced by the measuring light 41 in the first partial light path 68a, a second image plane 47b, which is produced by the measuring light 41 in the second partial light path 68b, and a third image plane 47c, which is produced by the measuring light 41 in the third partial light path 68c. The three image planes 47a, 47b, 47c are arranged axially behind one another, so that three correspondingly axially staggered images of the crossed-slit diaphragm 40 are obtained.

The first beam splitter 66a, the first shutter 69a, the first zoom lens 46a and the beam combiner 70a together form an ancillary lens system 62a. The same applies correspondingly to the optical elements in the other two partial light paths 68b and 68c.

If all the zoom lenses 46a, 46b and 46c are situated at the same height, the distance between the image planes 47a and 47b is approximately equal to the axial distance between the first and second beam combiners 70a and 70b. Correspondingly, the distance between the image planes 47b and 47c is approximately equal to the axial distance between the second beam combiner 70b and the second deflecting mirror 71. By moving the individual zoom lenses 46a, 46b and 46c axially, the image planes 47a, 47b and 47c within a region, which is defined by the length of the possible movement path of the zoom lenses 46a, 46b and 46c in movement section, can be displaced.

The measuring device according to the invention additionally includes a test piece holder 72, which is fastened to a holding ring 74. In the embodiment shown, the test piece P is a doublet having two lenses cemented together. The test piece consequently has three optical surfaces S1, S2 and S3 with centres of curvature K1, K2 and K3.

4. Measuring Method

The measuring method according to the invention will be described in greater detail in the following.

a) Calibration

Before the first measurement, the measuring device 60 should be calibrated, because only then can the highest measurement accuracies generally be achieved.

In the calibration measurement, a calibration test piece whose centre of curvature is accurately known is inserted into the test piece holder 72. The calibration test piece can to that end have been measured by means of an external measuring device, for example. The calibration test piece is preferably an optical system of the same type as that which is later to be measured in a larger number. The calibration test piece is measured in the measuring device 60 in the manner described hereinbelow under b). The measured values so obtained are then correlated with the known centres of curvature.

In this manner there are obtained calibration values with which later measured values on real test pieces can be corrected in order to be able to take account of material faults or alignment errors of the optical elements and of the test piece holder 56 of the measuring device 60.

In addition, it is possible to use for the calibration measurement a calibration test piece in which the positions of the centres of curvature of the optical surfaces are determined not highly accurately in an external measuring device but in the measuring device 60. To that end, the calibration test piece with the unknown centre of curvature is measured by means of the measuring device 60 in a plurality of different azimuthal angular positions. For this purpose, the measuring device 60 must have, instead of the holding ring 74, a turntable which is rotatable about an axis of rotation which preferably coincides approximately with the optical axis 34 of the autocollimator 22. The position of the centre of curvature can then be derived from the midpoint of the circular path on which the image of the crossed-slit diaphragm 40 on the image sensor 50 moves during rotation of the calibration test piece about the optical axis 34. When real test pieces are measured, measurement is carried out in only one angular position of the turntable in each case. The measuring results so obtained are then corrected as described above using the calibration values.

b) Measuring the Positions of the Centres of Curvature

In order to measure the positions of the centres of curvature K1, K2 and K3 of the optical surfaces S1, S2, S3 in the case of the multi-lens test piece P, a plurality of measuring operations must be carried out in succession, starting, for example, with the optical surface that is closest to the autocollimator 22. As can be seen in FIG. 7, that surface is the surface S1. The centre of curvature K1 of the surface S1 is furthest away from the lens system 62. Therefore, there is used for this partial measurement measuring light 41 which takes the first partial light path 68a, since the region having the longest focal lengths is associated therewith. To that end, the first shutter 69a is opened and the other two shutters 69b, 69c are closed.

Before the calibration measurement, the first zoom lens 46a of the ancillary lens system 62a has preferably already been moved so that the first image plane 47a lies in the vicinity of the centre of curvature K1 expected on the basis of the design data. The measuring light 41 from the first partial light path 68a, indicated by continuous lines in FIG. 7, then strikes the surface S1 perpendicularly and is reflected back on itself. The location of the image 40a' of the crossed-slit diaphragm 40 on the light sensor 50 is detected, as is illustrated by FIG. 8a. The position of the centre of curvature K1 is determined from that location, taking into consideration the previously stored calibration values, and stored in a data storage means of the evaluation device 63.

In a second step, the position of the centre of curvature K2 of the second surface S2 is measured. The centre of curvature K2 of the surface S2 lies between the centres of curvature K1 and K3 of the surfaces S1 and S3. Therefore, there is used for this measuring step measuring light 41 that takes the second partial light path 68b, since the region with the medium focal lengths is associated therewith. To that end, the second shutter 69b is opened and the other two shutters 69a and 69c are closed. This measuring light is indicated in FIG. 7 by long-dashed light beams.

Before the calibration measurement, the second zoom lens 46b of the ancillary lens system 62 has preferably already been moved so that the second image plane 47b lies in the vicinity of the centre of curvature K2 expected on the basis of the design data. The refractive effect of the first surface S1 of the test piece P has thereby already been taken into consideration. If an image of the crossed-slit diaphragm 40 were actually to form at the centre of curvature K2 of the surface S2, the measuring light 41 would not strike the surface S2 perpendicularly as a result of refraction at the first surface S1 situated upstream in the light path. The refractive effect of the first surface S1 is therefore to be taken into consideration mathematically, when determining the image plane 47b in which the crossed-slit diaphragm 40 is imaged in this second measuring operation, so that the measuring light 41 strikes the second surface S2 perpendicularly, as is shown in FIG. 7. In other words, the image plane 47b is not arranged where the centre of curvature K2 of the second surface S2 is actually situated but where it appears as seen from the second surface S2, if the centre of curvature K2 is considered through the optical surface S1. The location of the image 40b' of the crossed-slit diaphragm 40 on the light sensor 50 is then detected, as illustrated by FIG. 8b. The position of the centre of curvature K2 is determined from that location, taking into consideration the previously stored calibration values, and stored in a data storage means of the evaluation device 63.

The position of the centre of curvature K3 of the third surface S3 is measured in the same manner. To that end, measuring light 41 that has followed only the third partial light path 68c is used. When adjusting the third zoom lens 46c, mathematical consideration was given to the refractive effect not only of the first surface S1 but also of the second surface S2, for which reason it is here too not the actual centre of curvature that lies in the image plane 47c but only an apparent centre of curvature K3'. The position of the centre of curvature K3 is determined from the location, shown in FIG. 8c, of the image 40c' of the crossed-slit diaphragm 40 on the light sensor 50, taking into consideration the previously stored calibration values, and stored in a data storage means of the evaluation device 63.

The sequence of the above-described steps can of course also be changed as desired, because the results of one measuring step are not required to carry out another measuring step. The effect of the optical surfaces situated upstream in the beam path can in each case also be taken into consideration mathematically at the end. Accordingly, the measuring device 60 ultimately measures for the optical surfaces situated downstream not the real but only the apparent positions of the centres of curvature.

Because the shutters 69a, 69b and 69c are switchable very quickly, the three measuring steps described above can be carried out in a very short time, for example in less than one second. The positions of the centres of curvature K1, K2 and K3 can thus be measured very quickly, provided that the image planes 47a, 47b and 47c have been brought to the correct axial positions beforehand by means of the zoom lenses 46a, 46b and 46c. This quick measuring operation is advantageous in particular when the next measuring task consists in measuring a test piece P' of the same type, which in principle has the same design data, such as refractive indices, dimensions and radii of curvature, but the centres of curvature can lie at slightly different positions due to manufacturing tolerances. The test piece P' is then simply replaced by the test piece P. The subsequent measuring operation can then be carried out without any movements of zoom lenses or other components, apart from the operations of closing the shutters 69a, 69b, 69c. If the test pieces are exchanged by means of a robot arm, the measuring time required for complete measurement of the positions of the centres of curvature can be within the order of magnitude of a few seconds.

Figure 9:
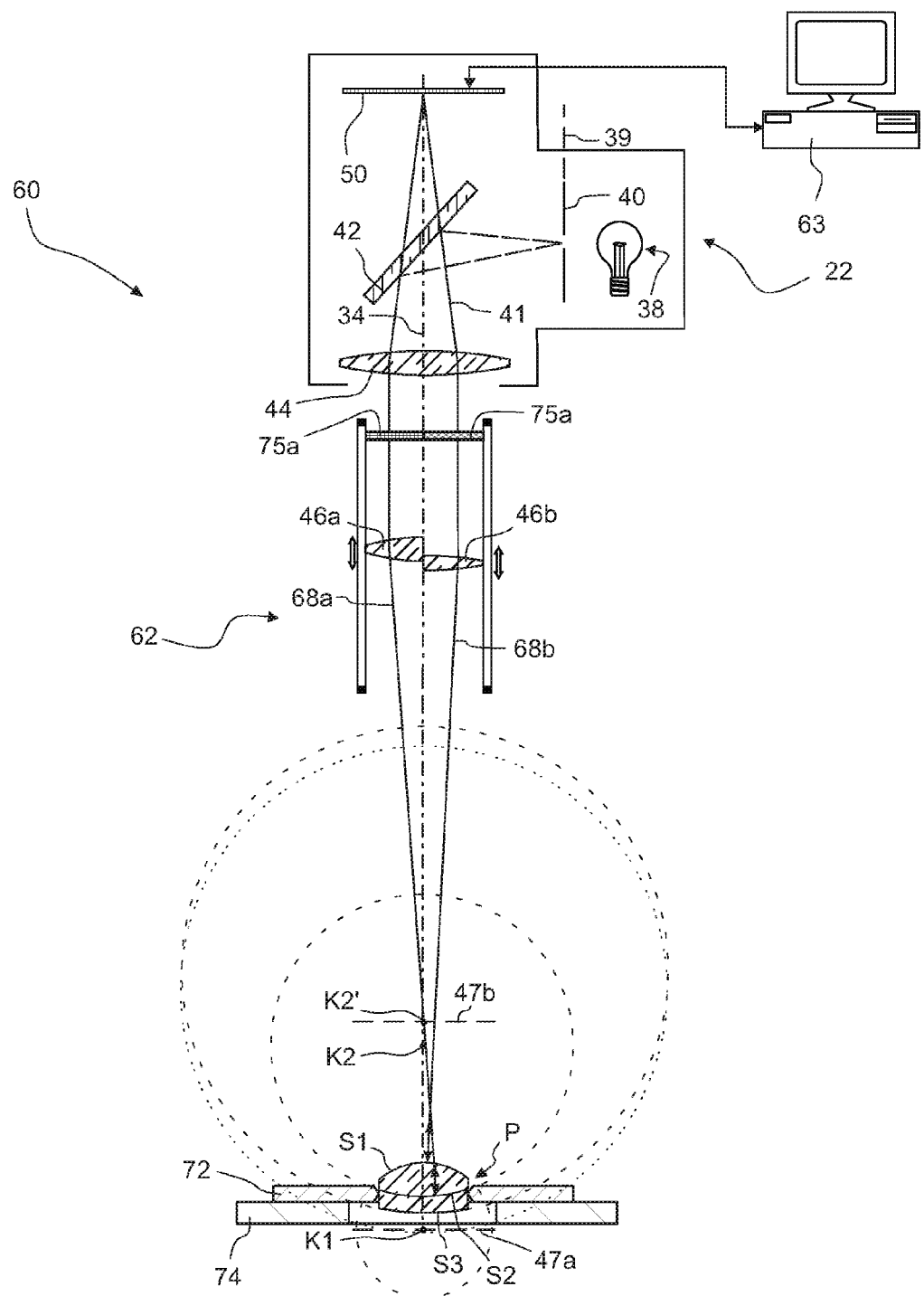
FIG. 9 is a meridional section through a measuring device according to the invention according to a second embodiment, in which an ancillary lens system divides the measuring light aperture into a plurality of azimuthal segments.

5. Alternative Embodiments a) Azimuthal Division of the Measuring Light Aperture FIG. 9 shows another embodiment of a measuring device according to the invention in a representation based on FIG. 7.

In this example, the entire aperture of the measuring light 41 is divided into three segments each of 120°. Each of these segments defines a partial light path and contains an axially movable zoom lens 46a, 46b and 46c. FIG. 10 shows a top view of the three zoom lenses 46a, 46b and 46c. They are not rotationally symmetrical but each consist only of a lens segment with an azimuth angle of 120°. If combined to form a complete aperture of 360°, the zoom lenses 46a, 46b and 46c would, however, be rotationally symmetrical.

The focal lengths of the zoom lenses 46a, 46b, 46c are different. In addition, the zoom lenses 46a, 46b, 46c can be moved independently of one another along the optical axis 34, as is indicated in FIG. 9 by double-headed arrows. The second zoom lens 46b is not visible in this representation because it is situated solely in the half of the measuring device 60 shown in section that faces the observer.

By means of the three segment-like zoom lenses 46a, 46b, 46c, three different image planes 47a, 47b and 47c can be produced simultaneously as in the embodiment described above, which image planes are situated in the vicinity of the actual positions of the centres of curvature or of the apparent positions of the centres of curvature, taking into consideration the refraction of surfaces situated upstream.

There are no shutters 69a, 69b, 69c in this embodiment. The images of the crossed-slit diaphragm 40, which form on the light sensor 50 by the reflections at the optical surfaces S1, S2 and S3 of the test piece P, therefore always appear simultaneously. In order to be able to distinguish the images from one another and associate them with the centres of curvature K1, K2 and K3 of the test piece P, three colour filters 75a, 75b and 75c are arranged in the collimated beam path of the ancillary lens systems 62a, 62b, 62c, which colour filters each have the shape of a segment, as illustrated in FIG. 11 in a top view. The colour filters 75a, 75b, 75c are so oriented that only light of a specific colour (that is to say of a specific wavelength range) ever strikes the zoom lenses 46a, 46b and 46c. The images 40a', 40b' and 40c' of the crossed-slit diaphragm 40 produced on the light sensor 50 accordingly also differ in colour and can thus easily be distinguished from one another, as is illustrated by FIG. 12.

b) Radial Division of the Measuring Light Aperture

Figure 7:
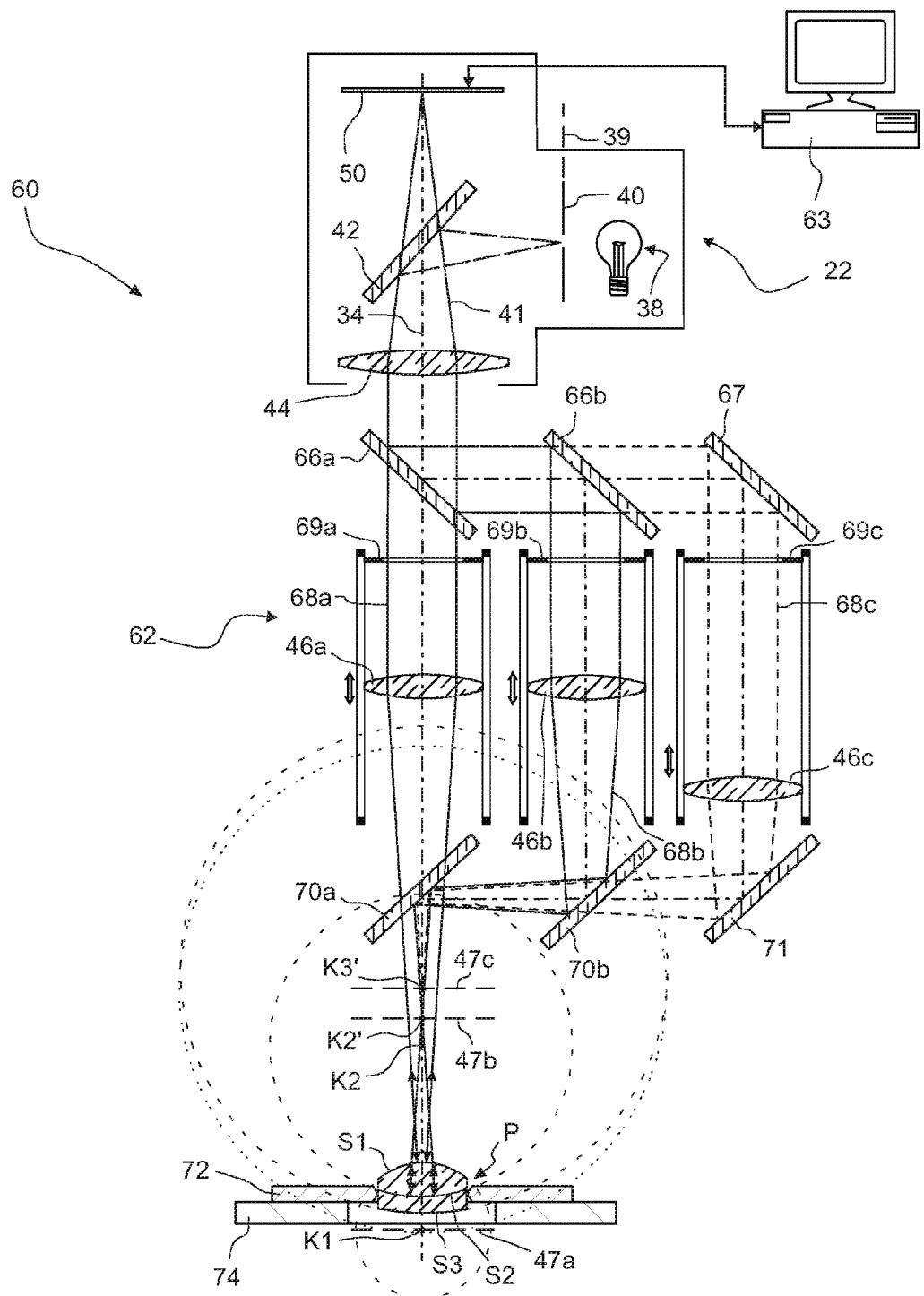
FIG. 7 is a meridional section through a measuring device according to the invention according to a first embodiment, wherein an ancillary lens system has a plurality of beam splitters.
Figures 13, 14, 15:
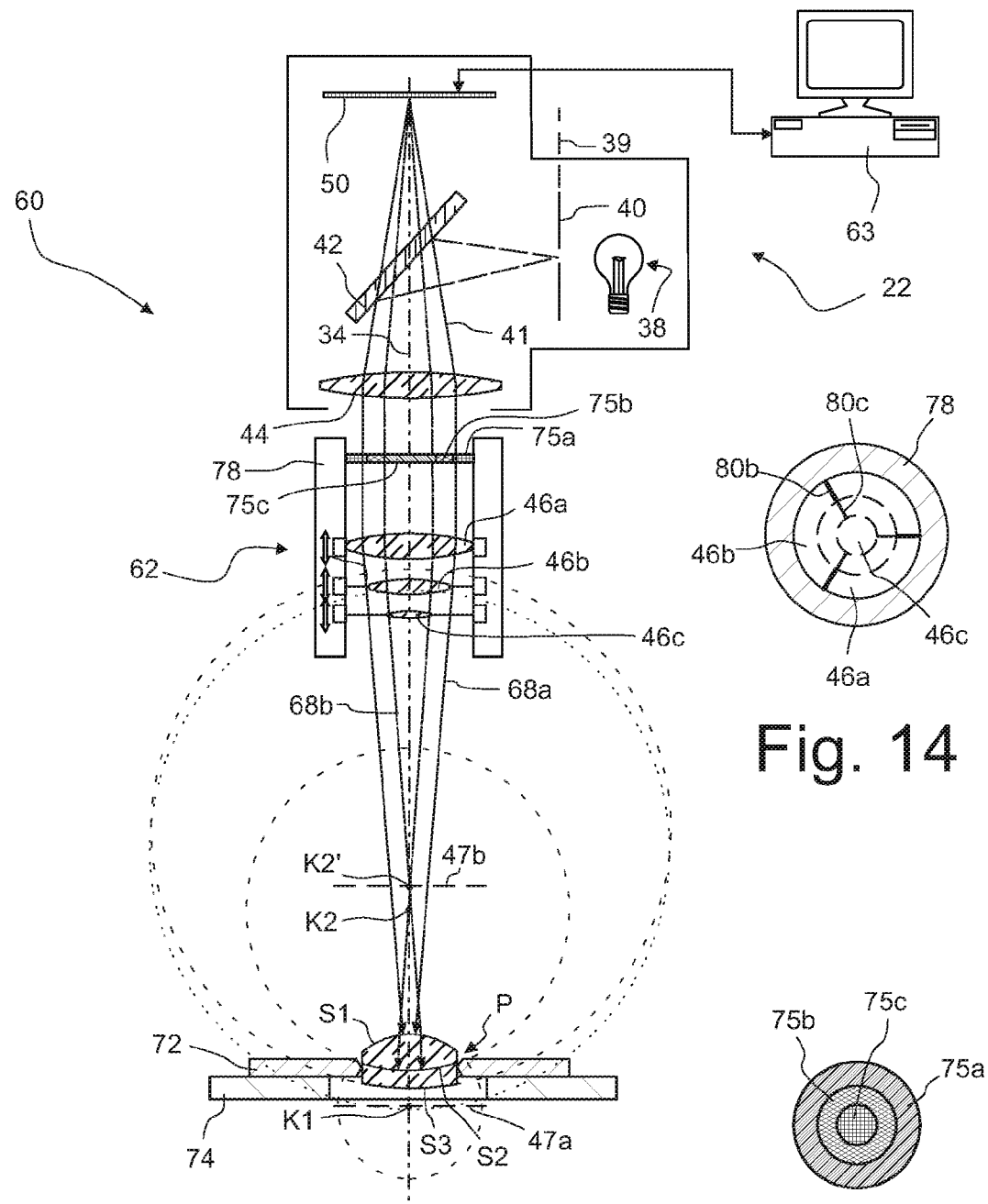
FIG. 13 is a meridional section through a measuring device according to the invention according to a third embodiment, in which an ancillary lens system divides the measuring light aperture into a plurality of radial rings.
FIG. 14 is a top view of an arrangement of three zoom lenses of different diameters of the measuring device shown in FIG. 14.
FIG. 15 is a top view of an arrangement of three colour filters of the measuring device shown in FIG. 13.

FIG. 13 shows a representation, based on FIGS. 7 and 9, of a measuring device according to a further embodiment of the invention.

Here too, different partial light paths 68a, 68b and 68c are produced, with which different image planes 47a, 47b are associated; in FIG. 13, the partial light path 68c and the image plane 47c associated therewith are not shown for the purpose of clarity. Unlike in the embodiment shown in FIG. 9, however, the partial light paths 68a, 68b and 68c are produced not by an azimuthal division of the measuring light aperture but by a radial division.

To that end, three lenses are arranged one behind the other in the ancillary lens system 62, the diameters of which lenses differ considerably. The diameters are such that a portion of the measuring light 41 passes through only the first zoom lens 46a, a second portion of the measuring light 41 passes only through the first zoom lens 46a and the second zoom lens 46b, and a third portion of the measuring light 41 passes through all three zoom lenses 46a, 46b and 46c. The three zoom lenses 46a, 46b and 46c can be moved individually, as is indicated in FIG. 13 by double-headed arrows. In a housing 78 of the ancillary lens system 62, the two smaller zoom lenses 46b and 46c are held by thin rods 80b and 80c, as is shown in FIG. 14 in a top view. The rods 80b, 80c are so thin that they obstruct only a negligible portion of the measuring light 41 as it passes through the ancillary lens system 62.

In this embodiment, therefore, the image planes 47a, 47b and the image plane 47c that is not shown are produced by radial segments of the aperture of the measuring light 41 which are different and do not overlap in the region of the image planes.

Correspondingly, the colour filters 75a, 75b and 75c in this embodiment are also not divided into segments but have the form of concentric rings or—in the case of the third colour filter 75c—of a circular disc. This arrangement of the colour filters 75a, 75b and 75c in the collimated beam path of the measuring light 41 ensures that the measuring light 41 focused in the three image planes 47a, 47b and 47c has different colours, so that here too the images of the crossed-slit diaphragm 40 on the light sensor 50 can be distinguished from one another on the basis of colour.

c) Diffractive Optical Element

Figure 16:
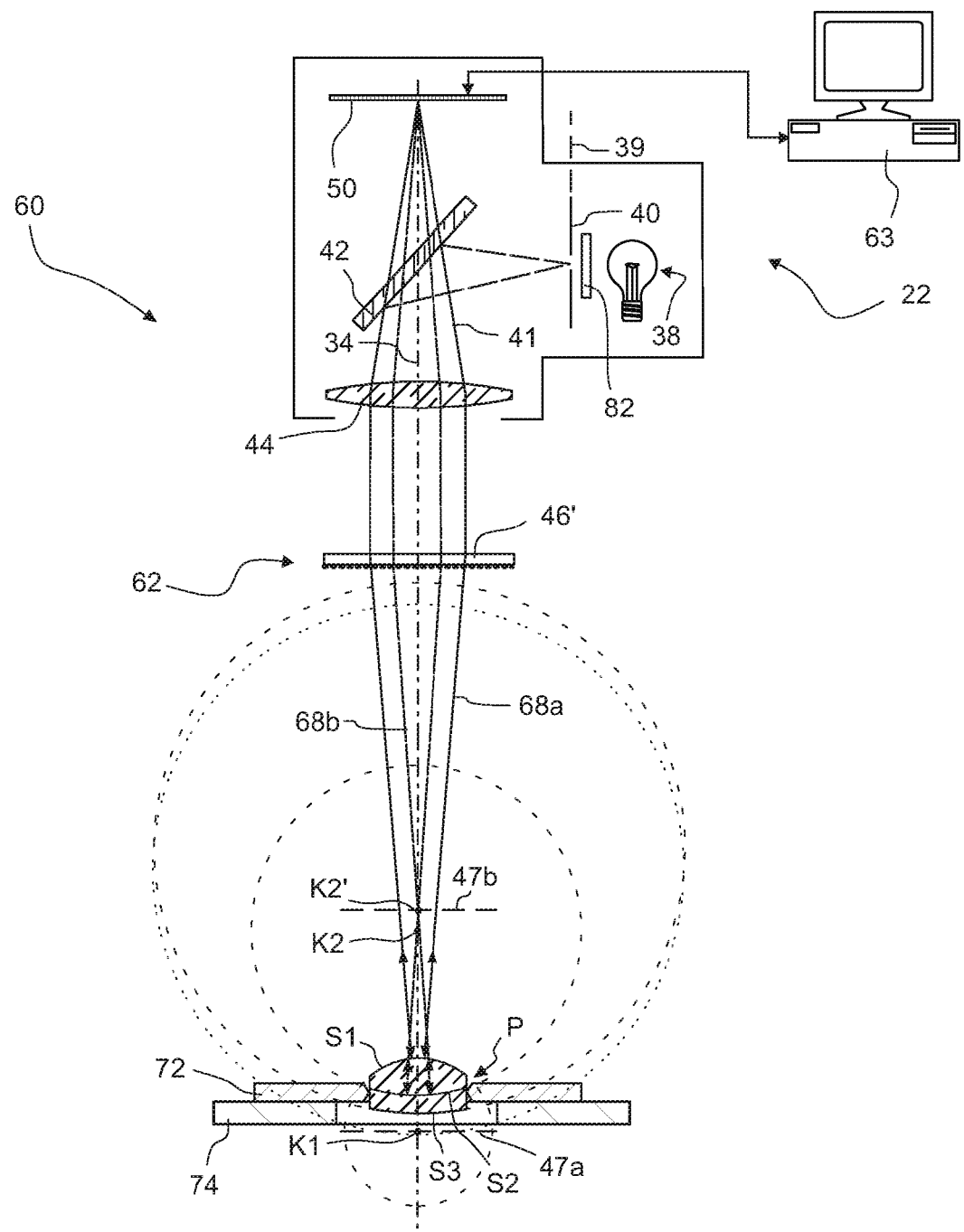
FIG. 16 is a meridional section through a measuring device according to the invention according to a fourth embodiment, in which a diffractive optical element divides the measuring light aperture into different and overlapping partial light paths in dependence on wavelength.

FIG. 16 shows, in a representation based on FIGS. 7, 9 and 13, a measuring device according to the invention according to a different embodiment, in which the ancillary lens system 62 has a diffractive optical element 46'. In addition, in the beam path of the measuring light 41, for example between the light source 38 and the crossed-slit diaphragm 40, there is a colour filter 82 which is permeable to light of only three narrow wavelength ranges, which preferably do not overlap. In the following, it is assumed that those wavelength ranges are located in the visible spectrum, for which reason they are referred to in the following as colours.

The diffractive optical element 46' is so designed that it focuses the incident collimated light in different focal planes in dependence on the colour, of which the focal planes 47a and 47b are shown in FIG. 16. As in the case of a refractive lens with longitudinal chromatic aberration, different focal planes for different colours thus form simultaneously. Here too, the images of the crossed-slit diaphragm 40 on the image sensor 50 can easily be distinguished from one another on the basis of the different colours.

By moving the diffractive optical element 46' along the optical axis 34, the image planes 47a, 47b and 47c can together be moved in the axial direction. In this embodiment, the image planes 47a, 47b, 47c can be adjusted individually and independently of one another only by replacing the colour filter with a colour filter that is permeable to different wavelength ranges. Unlike the other embodiments, however, different numbers of image planes can be produced by means of the diffractive optical element 46' with very little outlay and without light losses, because the colour filter 82 and/or the diffractive optical element 46' simply have to be replaced. The measuring device 60 can thus readily be changed from an operating mode in which only the positions of, for example, two specific centres of curvature are to be measured, to an operating mode in which, for example, ten centres of curvature are to be measured simultaneously.

Figure 17:
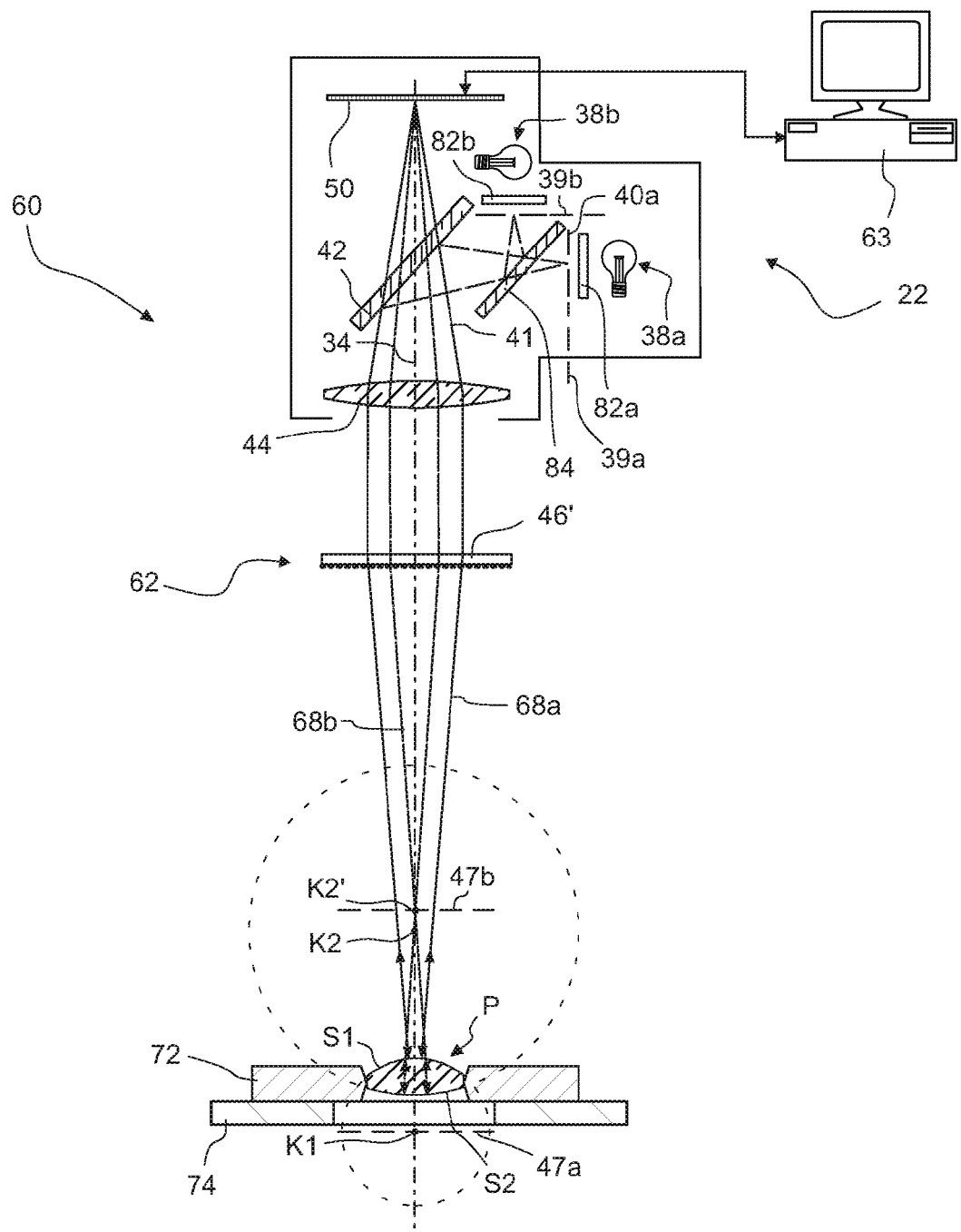
FIG. 17 is a meridional section through a modification of the fourth embodiment shown in FIG. 16, in which two different objects are imaged separately, but in a common beam path, at the two image planes.

FIG. 17 shows a modified embodiment in which the light path is divided upstream of the beam splitter 42 into two partial light paths by means of a second beam splitter 84. In a first partial light path, a first light source 38a illuminates a first crossed-slit diaphragm 40a via a first wavelength filter 82a which is permeable only to light of one colour. In a second partial light path, a second light source 38b illuminates a second crossed-slit diaphragm 40b via a second wavelength filter 82b which is permeable only to light of a different colour. Exactly one wavelength filter 82a or 82b is thus associated with each focal plane 47a, 47b. As a result, the focal planes can be displaced even more easily by replacing single wavelength filters individually.

Because in this embodiment the two diaphragms 40a, 40b are arranged in different object planes 39a and 39b, diaphragms with differently shaped diaphragm openings can be used. The images of the diaphragms on the light sensor 50 can then easily be distinguished from one another not only by their colours but also by their shape. Consequently, a colour-insensitive light sensor 50 can also be used in this embodiment.

In the embodiment shown, the test piece P has only two optical surfaces S1 and S2. If test pieces with more than two optical surfaces are to be measured, it is possible, as in the embodiment shown in FIG. 16, to use colour filters which are permeable to a plurality of wavelength ranges which do not overlap.

5. Important Method Steps

Figure 18:
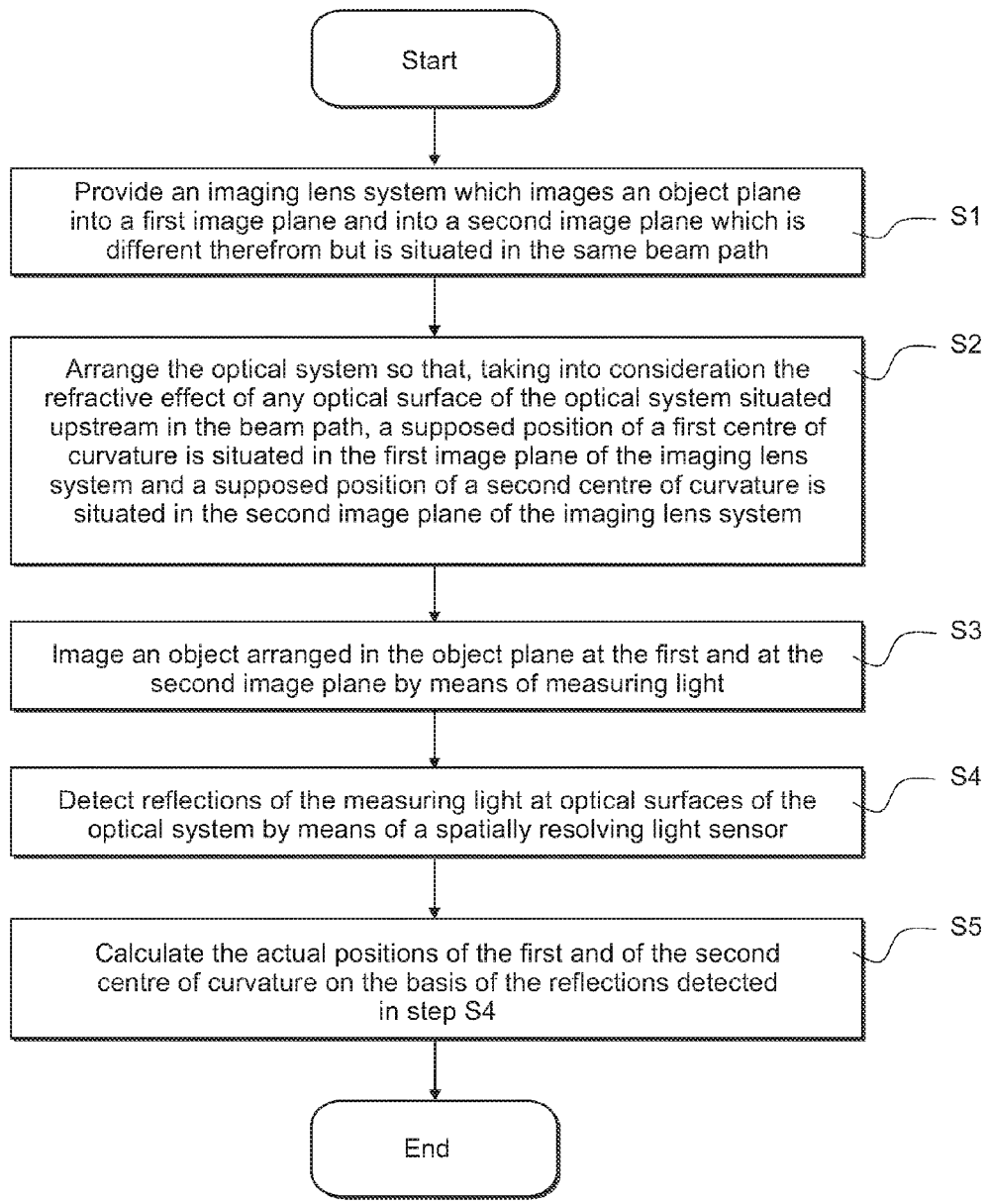
FIG. 18 is a flow diagram for explaining important steps of the method according to the invention.

Important steps of the method according to the invention will be described in the following with reference to the flow diagram shown in FIG. 18.

In a first step S1, an imaging lens system is provided which images at least one object plane into a first object plane and a second object plane different therefrom.

In a second step S2, the optical system is so arranged that, taking into consideration the refractive effect of any optical surface of the optical system situated upstream in the beam path, a supposed position of a first centre of curvature is situated in the first image plane of the imaging lens system and a supposed position of a second centre of curvature is situated in a second image plane of the imaging lens system.

In a third step S3, an object arranged in the object plane is imaged at the first and at the second image plane by means of measuring light.

In a fourth step S4, reflections of the measuring light at optical surfaces of the optical system are detected by means of a spatially resolving light sensor.

In a fifth step S5, the actual positions of the first and of the second centre of curvature are calculated on the basis of the reflections detected in the fourth step S4.

While specific embodiments of the invention have been shown and described in detail to illustrate the inventive principles, it will be understood that the invention may be embodied otherwise without departing from such principles.

We claim:

1. A method for measuring the positions of centres of curvature of optical surfaces of a single- or multi-lens optical system, comprising the following steps:
   a) providing an imaging lens system which images at least one object plane into a first image plane and simultaneously into a second image plane which is different therefrom;
   b) arranging the optical system in such a manner that, taking into consideration the refractive effect of any optical surface of the optical system situated upstream in the beam path, a supposed position of a first centre of curvature is situated in the first image plane of the imaging lens system and a supposed position of a second centre of curvature is situated in the second image plane of the imaging lens system;
   c) simultaneously or imaging an object arranged in the object plane at the first image plane and at the second image plane by means of measuring light which strikes the optical system from one side;
   d) detecting reflections of the measuring light at optical surfaces of the optical system by means of a spatially resolving light sensor;
   e) calculating the actual positions of the first centre of curvature and of the second centre of curvature on the basis of the reflections detected in step d).

2. The method according to claim 1, wherein, before the centres of curvature are measured, a calibration measurement is carried out, from which an allocation of locations on the light sensor with centres of curvature is derived.

3. The method according to claim 1, wherein the first image plane and the second image plane are produced by ancillary lens systems having different focal lengths, and wherein light paths of the ancillary lens systems that are separated by at least one first beam splitter arranged before the ancillary lens systems in the light propagation direction and are combined by at least one beam combiner arranged after the ancillary lens systems in the light propagation direction.

4. The method according to claim 1, wherein the first image plane and the second image plane are produced in azimuthal segments of a measuring light aperture associated with the measuring light, wherein the azimuthal segments are different and do not overlap in the region of a collimated beam path.

5. The method according to claim 1, wherein the first image plane and the second image plane are produced in radial segments of a measuring light aperture associated with the measuring light, wherein the radial segments are different and do not overlap in the region of a collimated beam path.

6. The method according to claim 1, wherein the first image plane and the second image plane are produced for measuring light of different wavelengths.

7. A device for measuring the positions of centres of curvature of optical surfaces of a single- or multi-lens optical system, comprising:
   a) an imaging lens system which is configured to image at least one object plane into a first image plane and simultaneously into a second image plane which is different therefrom;

b) a spatially resolving light sensor which is configured to detect reflections of measuring light at optical surfaces of the optical system;

c) an evaluation device which is configured to calculate the actual position of a first centre of curvature and of second centre of curvature on the basis of the reflections detected by the light sensor, after the optical system has been arranged so that, taking into consideration the refractive effect of any optical surface of the optical system situated upstream in the beam path, a supposed position of the first centre of curvature is situated in the first image plane of the imaging lens system and a supposed position of the second centre of curvature is situated in the second image plane of the imaging lens system, and after an object arranged in the object plane has simultaneously been imaged at the first and at the second image plane by means of measuring light which strikes the optical system from one side.

8. The device according to claim 7, wherein the imaging lens system does not comprise elements which are movable in the axial direction.

9. The device according to claim 7, wherein the evaluation device comprises a data storage means in which there are stored data relating to an allocation of positions of centres of curvature with locations on the light sensor.

10. A device for measuring the positions of centres of curvature of optical surfaces of a single- or multi-lens optical system, comprising:

a) an imaging lens system which is configured to image at least one object plane into a first image plane and simultaneously into a second image plane which is different therefrom;

b) a spatially resolving light sensor which is configured to detect reflections of measuring light at optical surfaces of the optical system;

c) an evaluation device which is configured to calculate the actual position of a first centre of curvature and of a second centre of curvature on the basis of the reflections detected by the light sensor, after the optical system has been arranged so that, taking into consideration the refractive effect of any optical surface of the optical system situated upstream in the beam path, a supposed position of the first centre of curvature is situated in the first image plane of the imaging lens system and a supposed position of the second centre of curvature is situated in the second image plane of the imaging lens system, and after an object arranged in the object plane has simultaneously been imaged at the first and at the second image plane by means of measuring light which strikes the optical system from one side, wherein the imaging lens system comprises two ancillary lens systems having different focal lengths, wherein light paths of the ancillary lens systems are separated by at least one first beam splitter arranged before the ancillary lens systems in the light propagation direction and combined by at least one beam combiner arranged after the ancillary lens systems in the light propagation direction.

11. The device according to claim 7, wherein the imaging lens system comprises at least one optical element which has in the azimuthal direction regions with a different focal length.

12. The device according to claim 7, wherein the first image plane and the second image plane are produced in radial segments of a measuring light aperture associated with the measuring light which are different and do not overlap in the region of a collimated beam path.

13. The device according to claim 7, wherein the imaging lens system comprises a multi-focal diffractive lens or a hybrid lens.

14. The device according to claim 7, wherein the imaging lens system comprises at least one optical element with longitudinal chromatic aberration, and wherein the device is configured to measure the centres of curvature by using first and second measuring light which differs by the wavelength.

15. A device for measuring the positions of centres of curvature of optical surfaces of a single- or multi-lens optical system, comprising:

a) an imaging lens system which is configured to image, with the help of measuring light, at least one object into a first image plane and simultaneously into a second image plane which is different therefrom;

b) a spatially resolving light sensor which is configured to detect reflections of measuring light at optical surfaces of the optical system;

c) an evaluation device which is configured to calculate a position of a first centre of curvature and of a second centre of curvature on the basis of the reflections detected by the light sensor.

16. The device of claim 15, wherein the evaluation device is configured to calculate the position of the first centre of curvature and of the second centre of curvature on the basis of reflections that are produced by different optical surfaces of the optical system, but are simultaneously detected by the light sensor.

17. The device of claim 15, wherein the imaging lens system does not contain a movable lens element.

* * * * *